United States Patent [19]

Hickman

[11] 4,067,702
[45] Jan. 10, 1978

[54] ISOTOPE SEPARATION BY SELECTIVE CHARGE CONVERSION AND FIELD DEFLECTION

[75] Inventor: Robert G. Hickman, Livermore, Calif.

[73] Assignee: The United States of America as represented by the United States Department of Energy, Washington, D.C.

[21] Appl. No.: 707,797

[22] Filed: July 22, 1976

Related U.S. Application Data

[62] Division of Ser. No. 405,973, Oct. 12, 1973, abandoned.

[51] Int. Cl.² .............................................. B01D 57/00
[52] U.S. Cl. .............................................. 55/2; 55/17; 250/281; 176/1; 176/9
[58] Field of Search .................... 176/1, 3, 9; 250/281, 250/282, 283, 284, 251; 55/2, 17

[56] References Cited

U.S. PATENT DOCUMENTS

| 2,758,006 | 8/1956 | Carter et al. | 250/284 |
| 3,424,904 | 1/1969 | Donnally | 250/251 |

OTHER PUBLICATIONS

Helv-Phys. Acta, 43, 1970, pp. 254-271, by Gruebler et al.
UCID-15893, 8/18/71, pp. 1-11, by Osher.
UCRL-74057, Rev. 1, 9/15/72, pp. 1-36, Figs. 1-10, by Hickman.

Primary Examiner—Harvey E. Behrend
Attorney, Agent, or Firm—Dean E. Carlson; Roger S. Gaither; Clifton E. Clouse, Jr.

[57] ABSTRACT

A deuterium-tritium separation system wherein a source beam comprised of positively ionized deuterium (D+) and tritium (T+) is converted at different charge-exchange cell sections of the system to negatively ionized deuterium (D−) and tritium (T−). First, energy is added to the beam to accelerate the D+ ions to the velocity that is optimum for conversion of the D+ ions to D− ions in a charge-exchange cell. The T+ ions are accelerated at the same time, but not to the optimum velocity since they are heavier than the D+ ions. The T+ ions are, therefore, not converted to T− ions when the D+ ions are converted to D− ions. This enables effective separation of the beam by deflection of the isotopes with an electrostatic field, the D− ions being deflected in one direction and the T+ ions being deflected in the opposite direction. Next, more energy is added to the deflected beam of T+ ions to bring the T+ ions to the optimum velocity for their conversion to T− ions. In a particular use of the invention, the beams of D− and T− ions are separately further accelerated and then converted to energetic neutral particles for injection as fuel into a thermonuclear reactor. The reactor exhaust of D+ and T+ and the D+ and T+ that was not converted in the respective sections is combined with the source beam and recycled through the system to increase the efficiency of the system.

4 Claims, 4 Drawing Figures

ISOTOPE SEPARATION BY SELECTIVE CHARGE CONVERSION AND FIELD DEFLECTION

ORIGIN OF THE INVENTION

The invention disclosed herein was made under, or in, the course of Contract No. W-7405-ENG-48 with the United States Atomic Energy Commission.

This is a division of application Ser. No. 405,973, filed Oct. 12, 1973 now abandoned.

BACKGROUND OF THE INVENTION

The present invention relates to the separation of a beam of isotopes in a first state of ionization into its isotopic components, and more particularly, it relates to efficiently separating such a beam by successive addition of energy to the beam to successively accelerate the isotopic components of the beam to the optimum velocity for efficient conversion in respective charge-exchange cells to opposite states of ionization to enable separation of the oppositely charged isotopic components by means of a field for deflecting the oppositely charged isotopic components in substantially different directions.

In general, isotope separation in relatively large quantities has been accomplished by means including cryogenic distillation, thermal diffusion, gaseous diffusion, centrifuges, chemical exchange, distillation, chromatographic columns, and electromagnetic fields such as in the calutron. In one prominent plant for separating the isotopes of hydrogen, the processes used include cryogenic distillation, thermal diffusion, and chromatographic column processes. However, the plant had a capital cost of 100 million dollars. Moreover, in prior art processes for large scale separation of isotopes, the chemical processes used require large inventories of individual isotope materials to be tied up in the plant in addition to the required input of combined isotopes that are separated in the process. In particular, the chemical separation of deuterium and tritium is estimated to require an inventory in the range of 100 liters of liquid tritium for separating a joint source of deuterium and tritium at a rate of 2 kg/hr. Tritium, because of its scarcity and radioactivity, is both expensive and hazardous. Thus, large inventories of tritium, because of the amount involved, are especially hazardous in the event of a rupture of the containing vessel. There is additional hazard where tritium is separated at a plant that is remote from the place of use since transportation entails loading and unloading a container, a process during which extra precautions would need to be taken against a spill. Additional precautions would also be required against rupture of the vessel in transit, as well as against the tritium contamination of the vessel and the filling and unloading equipment.

SUMMARY OF THE INVENTION

In brief, the present invention pertains to a system for separating isotopes of the same element and includes: a joint source to ionize the isotopes to provide a multitude of ions initially in the same charge state; means for accelerating the singly-charged ions of one of the isotopes to a predetermined velocity, the other ions having different mass and therefore being accelerated to a different velocity; means for converting the ions that are accelerated to the predetermined velocity to a charge state of ionization that is opposite to the initial charge state, the converting means having a peak efficiency of conversion of the ions at the predetermined velocity to thereby convert the ions that are at the predetermined velocity and leave the other ions in their initial charge state except for doubly-charged ions which are neutralized in the converting means; and means for applying a deflecting force to all of the ions emerging from the converting means, the force acting on all of the ions to deflect the ions that have retained their initial charge in one direction and those with an opposite charge in the opposite direction to thereby distinctly separate the isotopes into two groups.

It is an object of the invention to efficiently separate isotopes regardless of the input combination of the isotopes.

Another object is to eliminate the use of large inventories of individual isotopes in isotope separation processes.

Another object is to effectively separate large quantities of dueterium and tritium with an arrangement that is small, compact and of minimal cost.

Another object is to provide a deuterium-tritium separation system that is adaptable to be incorporated in a thermonuclear mirror reactor system.

Another object is to restrict the spread of tritium to an absolute minimum in the operation and maintenance of a thermonuclear reactor.

Another object is to efficiently and safely provide neutral beams for fueling a thermonuclear mirror reactor.

Another object is to provide a simple convenient arrangement for removing protium from a thermonuclear reactor.

Other objects and advantageous features of the invention will be apparent in a description of a specific embodiment thereof, given by way of example only, to enable one skilled in the art to readily practice the invention, and described hereinafter with reference to the accompanying drawings.

DESCRIPTION OF AN EMBODIMENT

Figure 1:
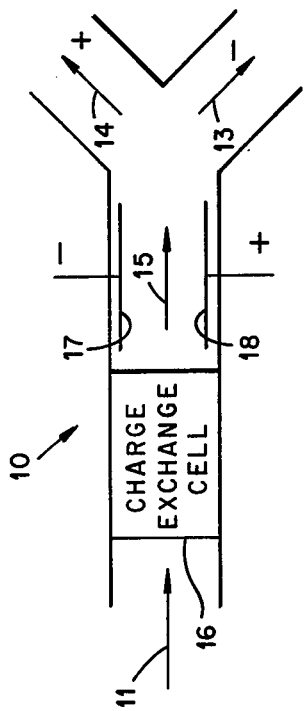
FIG. 1 is a schematic diagram of a basic unit for separating a beam of ionized isotopes into its components, according to the invention.

Referring to the drawing there is shown in FIG. 1 a basic unit 10 for separating ionized isotopes that comprise a primary beam 11 and that are in a substantially uniform charge state into secondary negatively and positively ionized beams 13 and 14. Any neutral molecules present may be removed by means of diffusion pumps and recycled at this stage of the process for ionization, conversion and deflection. The unit 10 includes a charge-exchange cell 16 for converting the ionized isotopes in beam 11 to their opposite charge state. A characteristic of the cell 16 is that it has a peak efficiency of conversion at a predetermined velocity of the ionized isotopes. Since isotopes have different masses, the addition to or subtraction of the energy of the beam will alter the velocity of the isotopes to different degrees, the velocities of the isotopes being inversely proportional to the square root of their masses. Thus, one of the isotopes alone may be brought by either positive or negative acceleration to the predetermined velocity, while the others will be at different velocities. Since charge conversion by the cell 16 occurs predominately at the predetermined velocity, only the isotope at that velocity will be converted to the opposite charge state while the remainder of the isotopes will remain unconverted in their opposite charge state.

After passing through the cell 16, the converted and unconverted isotopes comprise a beam 15 which is subjected to a field which may be conveniently established by means of a pair of electrostatic field plates 17 and 18 which are oppositely charged to a sufficient potential differential to deflect the ionized isotopes. The plate 17 is shown with a negative charge so that the positively ionized isotopes are attracted towards the plate and are thus deflected to form a positively ionized beam 14. The plate 18 is shown positively charged so as to attract the negatively ionized isotopes towards the plate for deflection to form a negatively ionized beam 13. The positive and negative ions of the beam 15 are thus separated; and since only one of the isotopes of the beam 11 was converted, the converted isotope is effectively separated from the unconverted isotopes. Alternatively, a magnetic field may be used in place of the electrostatic field between the plates 17 and 18. However, negligible power is required to create an electrostatic field as compared to a magnetic field and the capital cost of electrostatic field devices should be considerably less than electromagnetic devices.

Figure 2:
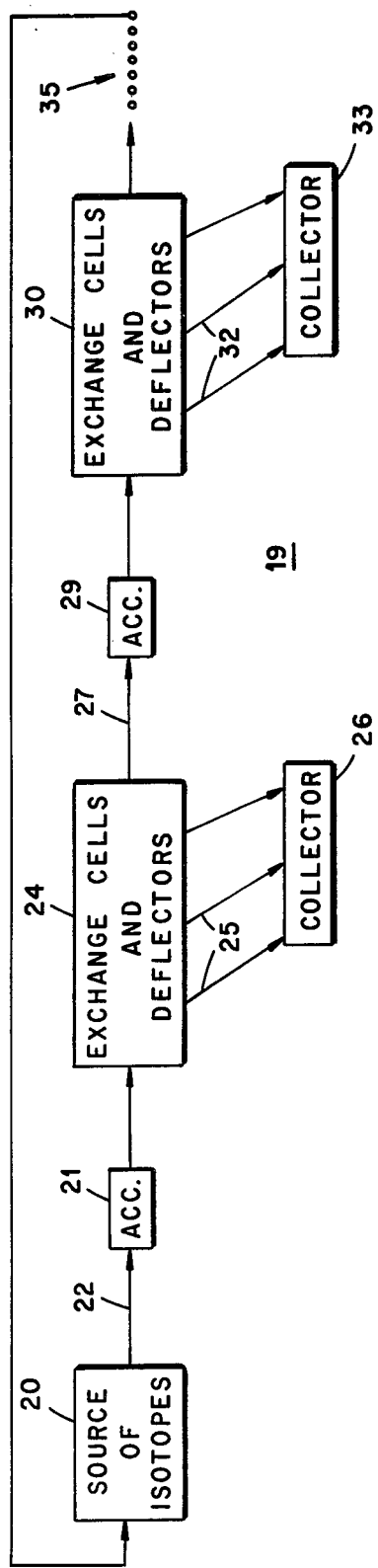
FIG. 2 is a block diagram of an isotope separation system incorporating the basic unit of FIG. 1.

A representative isotope separation system 19 is shown in FIG. 2, and includes a source 20 of ionized isotopes for forming a beam 22 to be separated and an accelerator 21 for bringing a selected one of the ionized isotopes to the predetermined velocity for maximum efficiency of conversion in a charge-exchange cell 16. An isotope separator unit 24 comprised of a series of basic units 10 receives the accelerated beam 22. Since only one of the ionized isotopes has been accelerated to the predetermined velocity, only this one will be converted and deflected in each of the basic units 10 in the separator unit 24 to form a series of beams 25 of the separated isotope that may be accumulated in a collector 26. A series of basic units 10 are required since the conversion efficiency of the cells 16 is less than 100%.

A beam 27 emerges from the separator 24 that is enriched in the unconverted isotopes. A second accelerator 29 is provided to further accelerate the beam 27 to bring another of the isotopes in the beam to the predetermined velocity of maximum conversion in a cell 16. A second isotope separator unit 30 also comprised of a series of basic units 10 receives the accelerated beam 27 to convert and separate therefrom only the isotope that has been accelerated to the predetermined velocity to form beams 32 of the isotope for accumulation in a collector 33.

Additional stages 35 of acceleration, separation and collection may be provided for each additional isotope in the beam 22; and the unconverted isotopes emanating from the last stage may be recirculated by combining them with the beam 22 for further processing in the system.

The present invention is particularly useful in a system 36 (FIG. 3) for separating deuterium and tritium for their injection as fuel into a thermonuclear reactor 38. For many types of thermonuclear reactors it is desirable that the injected fuel be in a neutral charge state in order to avoid deflection by the various electric and magnetic fields that are usually present. Moreover, the deuterium and tritium must be injected into the reactor at very high energies in order for the fusion reaction to be carried out. Since only charged particles can be conveniently accelerated, the deuterium and tritium must be in an ionized state during their acceleration and thereafter neutralized in a charge-exchange cell just prior to injection into the reactor. However, as discussed previously, charge-exchange cells have a peak conversion efficiency at a predetermined velocity of the particles undergoing conversion; and in addition, such cells are more efficient in neutralizing negative ions then positive ions at the injection energies (several hundred Kev) required for thermonuclear mirror reactors. However, ion sources generally do not produce an abundance of negatively charged ions. Moreover, deuterium and tritium have different masses so that it is inconvenient to accelerate them simultaneously to the same velocity. Thus, it is desirable that deuterium and tritium first be positively ionized, separated, then separately accelerated to the predetermined velocity, converted to neutral beams and then injected into the reactor. This is the process carried out in the system 36.

The system 36 includes a source 39 of positively ionized isotopes of deuterium and tritium. An extractor 41 is provided for accelerating all of the isotopes to form a beam 42 but may be particularly set to accelerate protium, with which the source is usually contaminate, to the predetermined velocity for peak conversion efficiency of a charge-exchange cell 16. A unit 10' including a cell 16 and deflection plates 17 and 18, may be provided for removing the protium from the beam for collection in a collector 44 which may conveniently be a sheet of titanium. A purified beam 45 emerges from the unit 10' and is given energy by means of an accelerator 47 to bring the positively ionized deuterium in the beam to a predetermined velocity which corresponds to the peak conversion efficiency of a charge-exchange cell 16. A separator 48, which includes a series of units 10, receives the accelerated beam 45 for converting the deuterium in the beam to negative ions and then deflecting the ions towards an accelerator 50 which forms them into a beam 53 and which adds energy to the ions to bring them to a predetermined velocity corresponding to that required for injection into the reactor. A neutralizer 51 is used to convert the negatively ionized beam 53 to a neutral beam 54 which is injected as fuel into the reactor 38.

A beam 56 emerges from the separator 48 that is enriched in positively ionized tritium. An accelerator 57 is provided to further accelerate the beam 56 to bring the ionized tritium to the predetermined velocity for maximum conversion in cells 16 in an isotope separator 59 for converting the positively ionized tritium to negative ions. The separator 59 also includes plates 17 and 18 following each cell 16 to deflect the negative ions to an accelerator 60 in which the ions are formed into a beam 61 and given energy to bring them to a predetermined velocity corresponding to that required for injection into the reactor. The beam 61 is converted to a neutral beam 63 of tritium by means of a neutralizer 62 for injection as fuel into the reactor 38.

The unconverted isotopes emerging from the separator 59 may be combined with exhaust from the reactor 38 and the combination passed through a stripper 65 for removing helium waste to form a stream 66 that is enriched with hydrogen istopes from which deutrium and tritium may be scavenged for reactor fuel by recycling the stream 66 and any other recycle streams to the source 39. The combination may be reprocessed in the system 36 as described to thereby increase the efficiency of the system.

An alternative system 68 (FIG.4) also incorporates the present invention for separating deuterium and tritium to enable individual acceleration of the deuterium and tritium and their individual neutralization and injection into the reactor 38. The system 68 includes a source 69 of ionized hydrogen isotopes, which is either a joint source of deuterium and tritium or is predominately deuterium. An extractor 70 is provided for accelerating the isotopes to form a beam 72 and to bring any protium with which the beam usually is contaminated to the predetermined velocity for peak conversion efficiency of a charge-exchange cell 16. A unit 10″, including a cell 16 and deflection plates 17 and 18, is provided for removing the protium from the beam for collection in a collector 73. A purified beam 76 emerges from the unit 10″ and is given additional energy by means of an accelerator 77 to bring the positively ionized deuterium in the beam to a predetermined velocity of peak conversion efficiency of a series of charge-exchange cells 16 in a separator unit 79 that also includes deflection plates 17 and 18 following each cell for deflecting the deuterium that has been converted to negative ions towards an accelerator 80 in which the ions are formed into a beam and given sufficient energy to bring the ions to the predetermined velocity required for injection into the reactor. The ions are then passed through the neutralizer 82 and are converted therein to a neutral beam 83 which is injected as fuel into the reactor 38.

A beam 85 that is enriched in tritium emerges from the separator 79. The beam is directed to be combined with the isotopes from a second isotope source 86 of ionized hydrogen isotopes and which is either a joint source of deuterium and tritium or is a source predominately of tritium. An extractor 88 is provided for accelerating the isotopes to form a beam 89 to bring any protium in the beam to the velocity for peak conversion efficiency of a charge-exchange cell 16. A unit 10‴, including a cell 16 and deflection plates 17 and 18, is provided for removing the protium from the beam 89 for collection in a collector 91. A purified beam 93 emerges from the unit 10‴ and is given additional energy by means of an accelerator 94 to bring the positively singly ionized tritium in the beam 93 to the velocity of peak conversion efficiency in a series of charge-exchange cells 16 in a separator unit 96 that also includes deflection plates 17 and 18 following each cell for deflecting the negatively ionized tritium towards an accelerator 97 in which the ions are formed into a beam and energy is added to the ions to bring them to the velocity corresponding to that required for injection into the reactor 38. The ions pass through the neutralizer 98 and are converted therein to a neutral beam 99 which is injected as fuel into the reactor 38.

A beam 100 that is enriched in deuterium emerges from the separator 96. The beam 100 is directed to be combined with the isotopes from the source 69 for recirculation and separation as described.

The exhaust from the reactor 38 may be recirculated through the system 68 by combining the exhaust with the isotopes from the sources 69 and 86 after the exhaust is passed through a stripper 101 to remove helium waste, the recirculation thereby maximizing the efficiency of the system 68.

Figure 3:
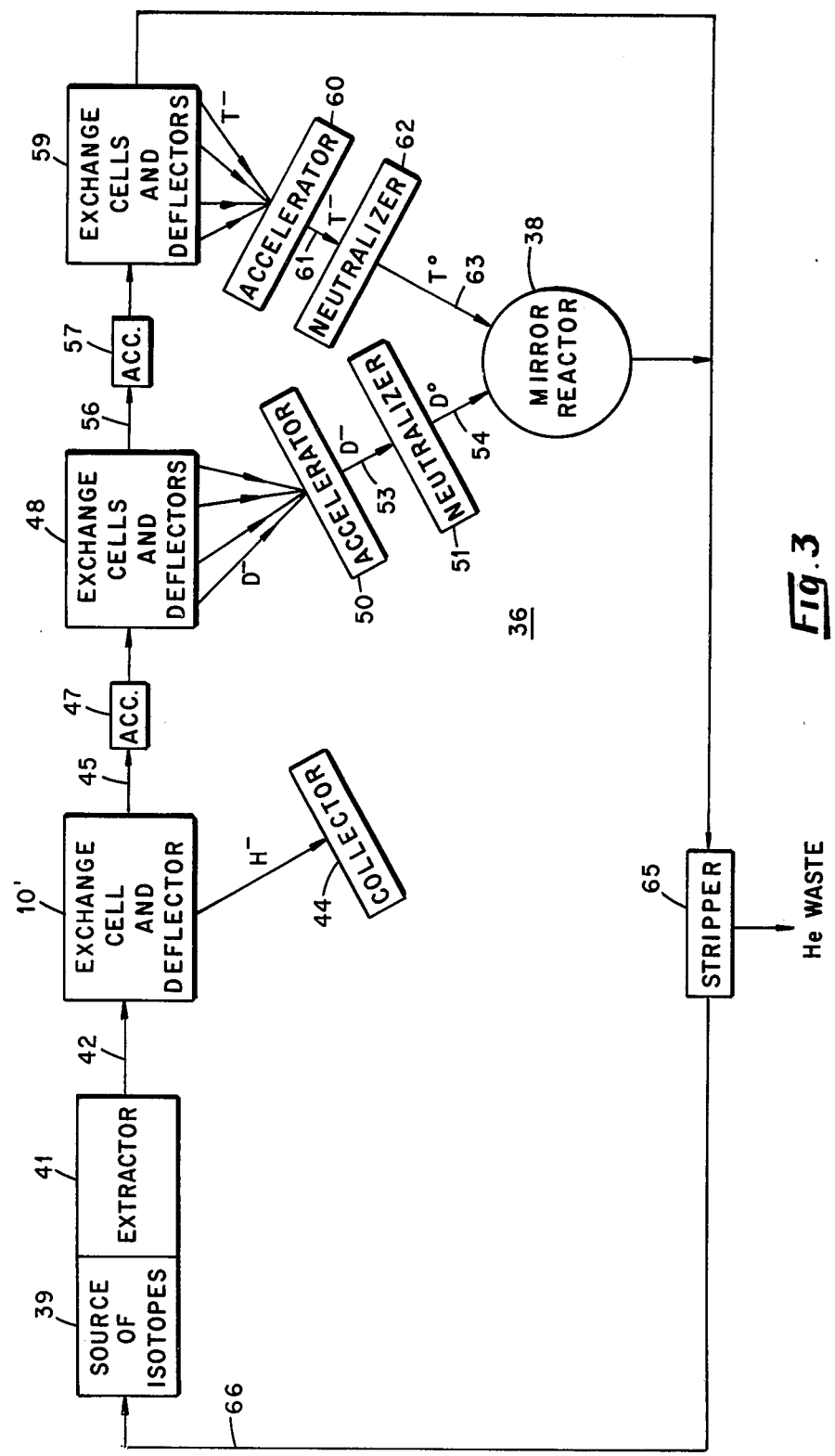
FIG. 3 is a block diagram of the deuterium-tritium separation system of FIG. 2 shown incorporated in a thermonuclear mirror reactor system.
Figure 4:
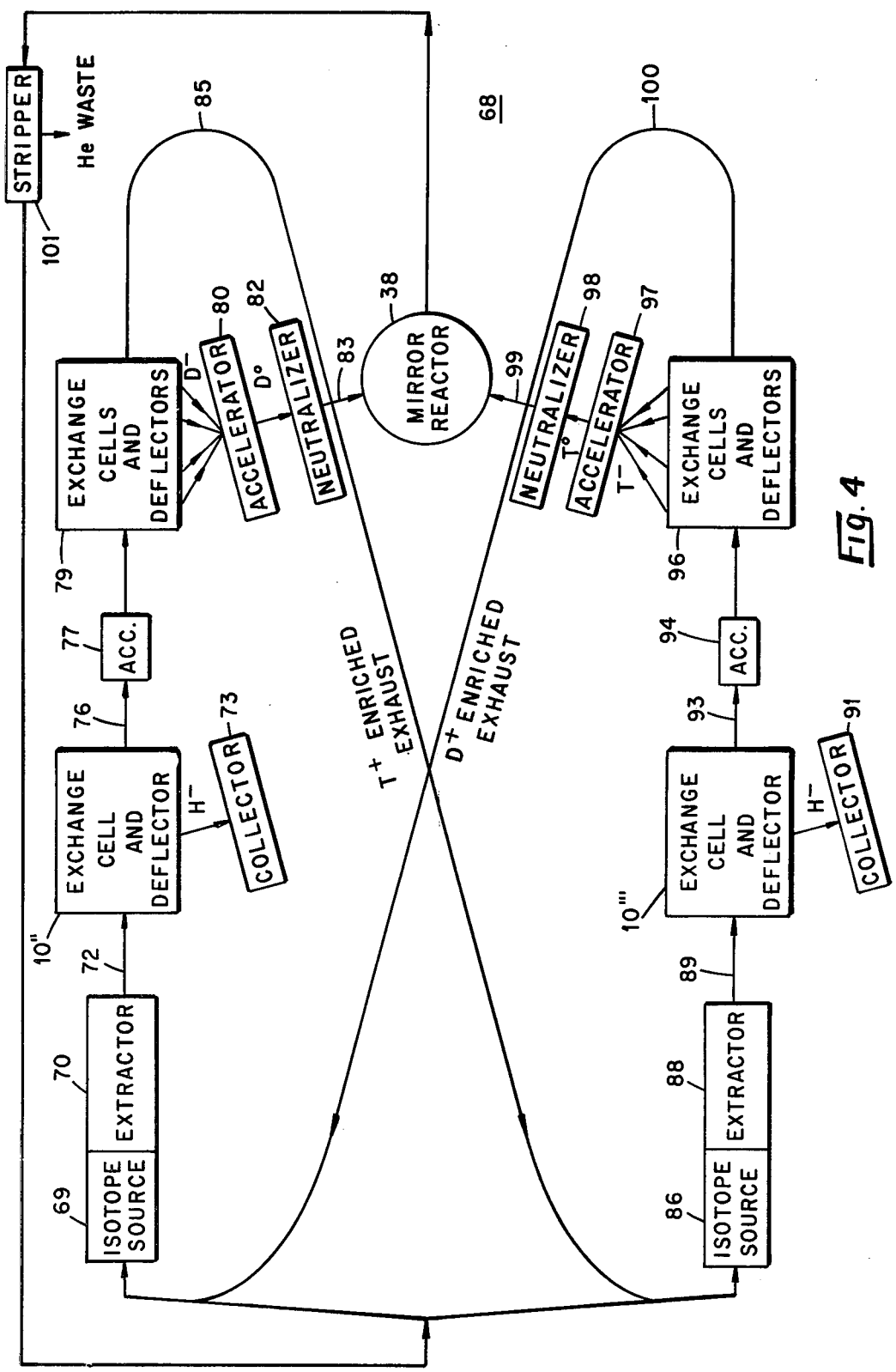
FIG. 4 is a block diagram of another deuterium-tritium separation system, similar to that of FIG. 3 and also shown incorporated with a thermonuclear reactor system.

Devices for conducting and guiding the isotopes in the systems 19, 36 and 68 between the blocks shown in the FIGS. 2, 3 and 4 may be well known conduits and magnetic or electric field devices generally used in systems for processing charged particles.

For further discussion and theoretical treatment of the present invention reference is made to USAEC technical report No. UCRL-74057, Rev. 1, Some Problems Associated with Tritium in Fusion Reactors, Robert G. Hickman, Lawrence Livermore Laboratories, Livermore, Calif. 94550.

While an embodiment of the invention has been shown and described, further embodiments or combinations of those described herein will be apparent to those skilled in the art without departing from the spirit of the invention.

What I claim is:

1. A method for separating first and second isotopes of the same element, said isotopes initially being in a first charge state of ionization, including the steps of:

initially adding energy to said isotopes to accelerate said first isotope to a predetermined velocity, said second isotope being accelerated to a different velocity than said predetermined velocity;

converting said accelerated first isotope to a charge state of ionization that is opposite to said first charge state, said conversion occuring in a first charge-exchange cell having a peak efficiency of conversion of said first isotope at said predetermined velocity to thereby leave said second isotope substantially in its first state of ionization;

applying a first deflecting force to said first and second isotopes emerging from said charge-exchange cell to deflect said first and second isotopes in opposite directions, said isotopes thereby being separated;

adding energy to said second isotope after said application to said isotopes of said first deflecting force to accelerate said second isotope to said predetermined velocity;

converting said second isotope at said predetermined velocity to a charge state of ionization that is opposite to said first charge state, said second conversion occuring in a second charge-exchange cell having a peak efficiency of conversion of said second isotope at said predetermined velocity; and applying a second deflecting force to said converted second isotope and any associated unconverted isotopes emerging from said second cell to deflect oppositely charged isotopes in opposite directions to separate said converted second isotope from the deflected unconverted isotopes.

2. The method of claim 1, further including the step of recirculating the deflected unconverted isotopes for said initial step of adding energy to said isotopes for reprocessing.

3. The method of claim 1, wherein said first isotope is deuterium and said second isotope is tritium.

4. The method of claim 1, wherein said first isotope is tritium and said second isotope is deuterium.

* * * * *